Sept. 12, 1967  R. W. WHEELER ETAL  3,341,312
METHOD OF SUPPORTING A THERMOPLASTIC SHEET WITH GAS
Filed June 4, 1964  10 Sheets-Sheet 1
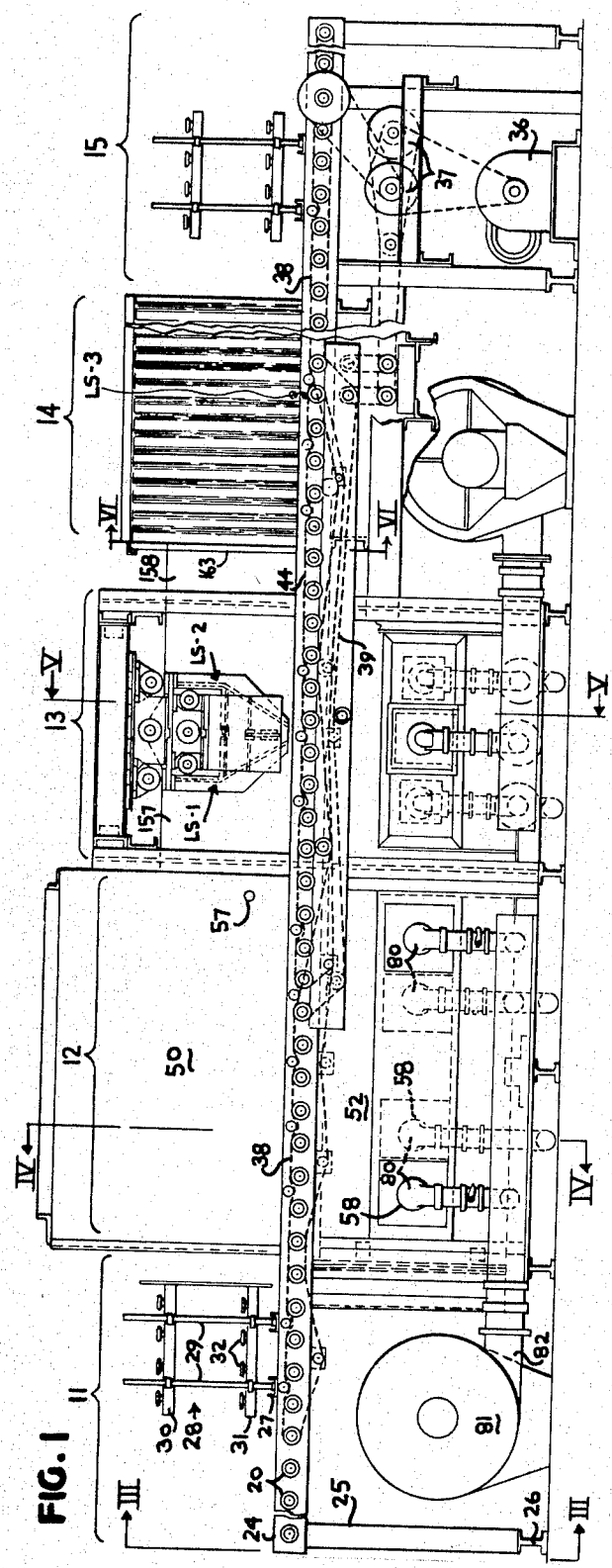
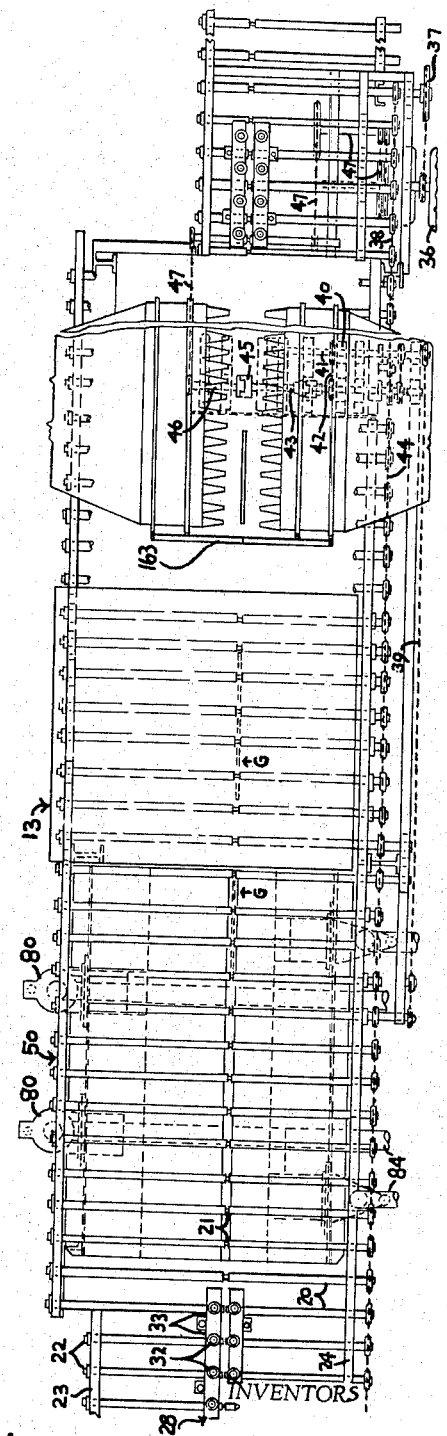
INVENTORS
BY ROBERT W. WHEELER and
CHARLES R. DAVIDSON JR.
Chisholm and Spencer
ATTORNEYS

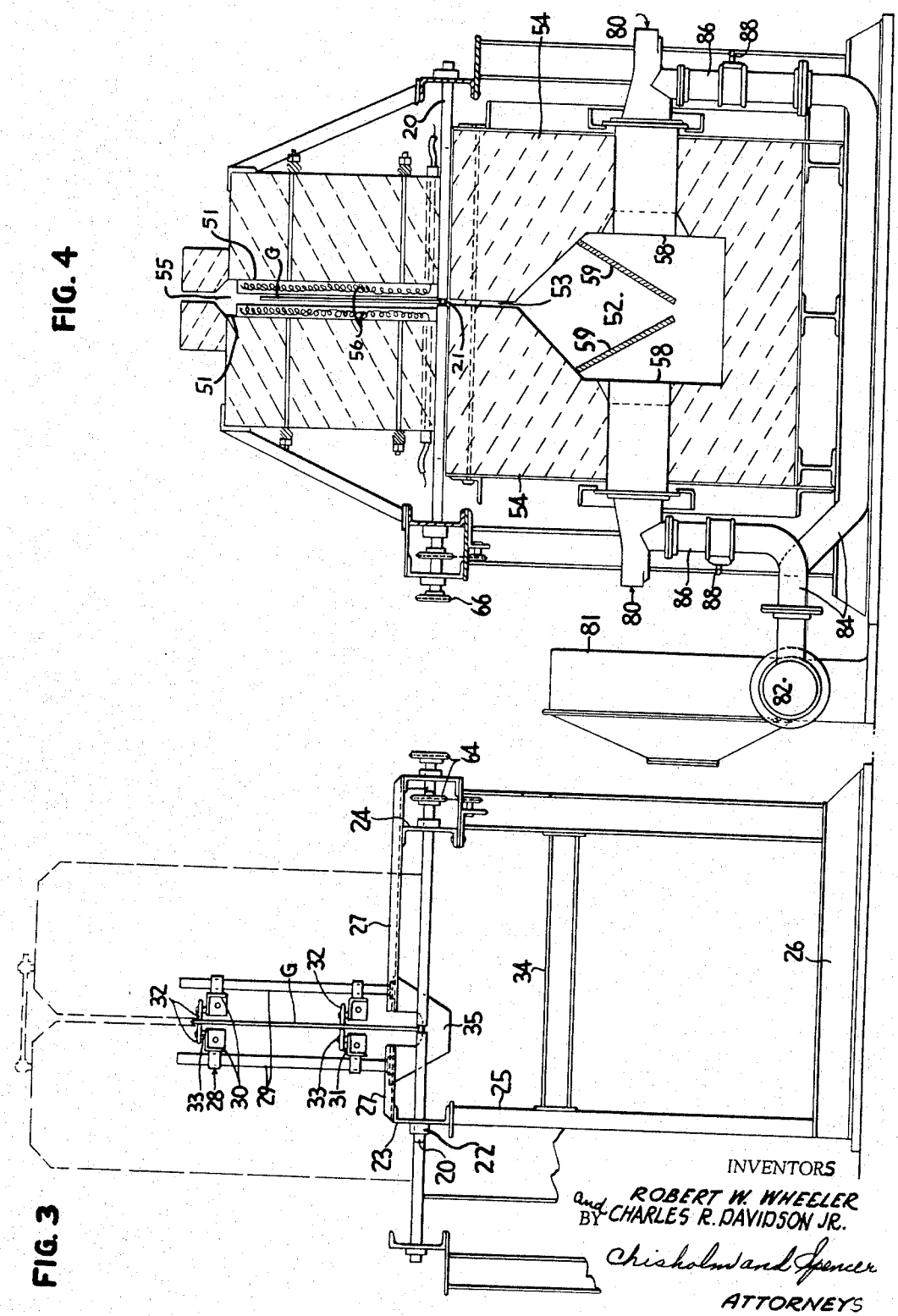

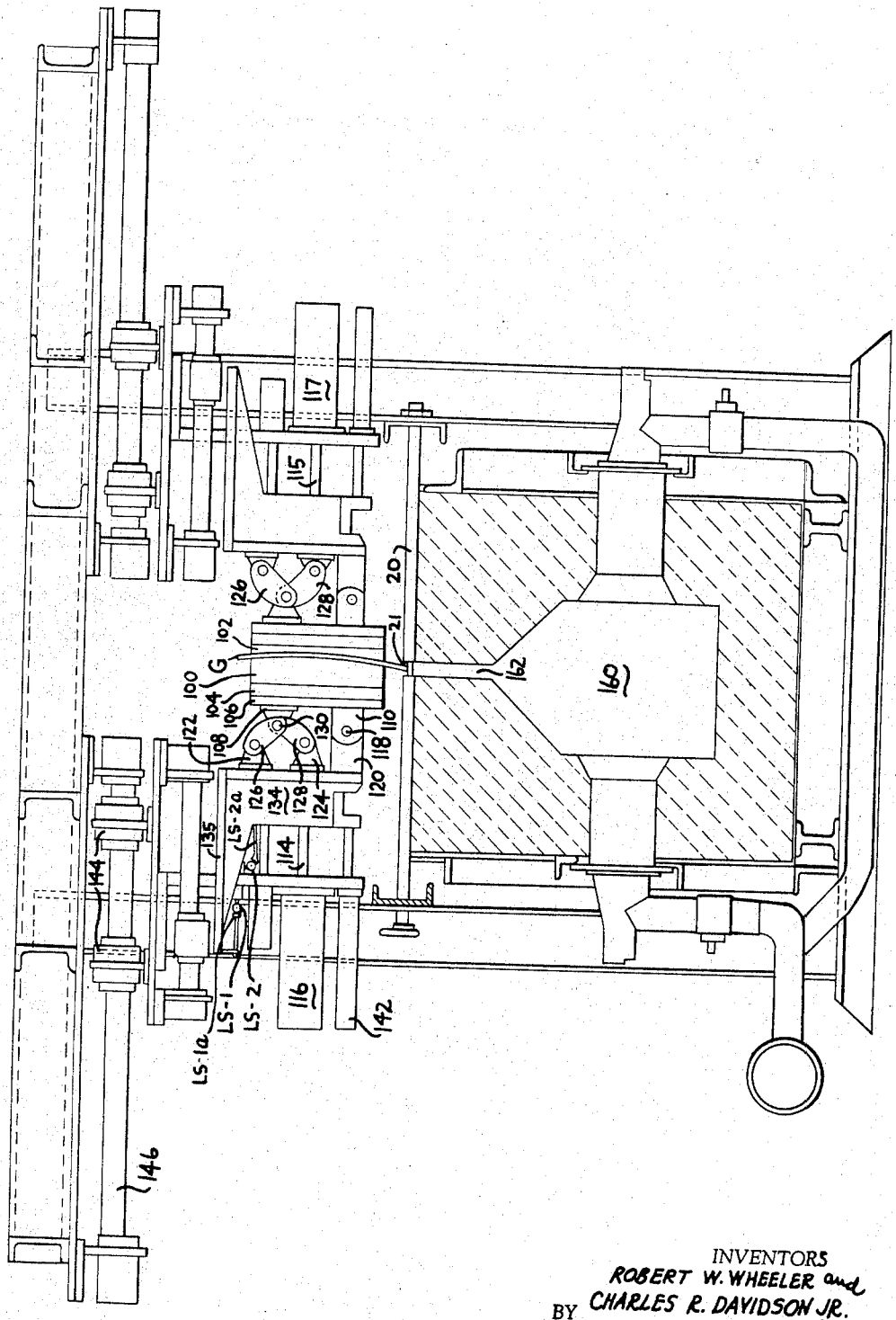

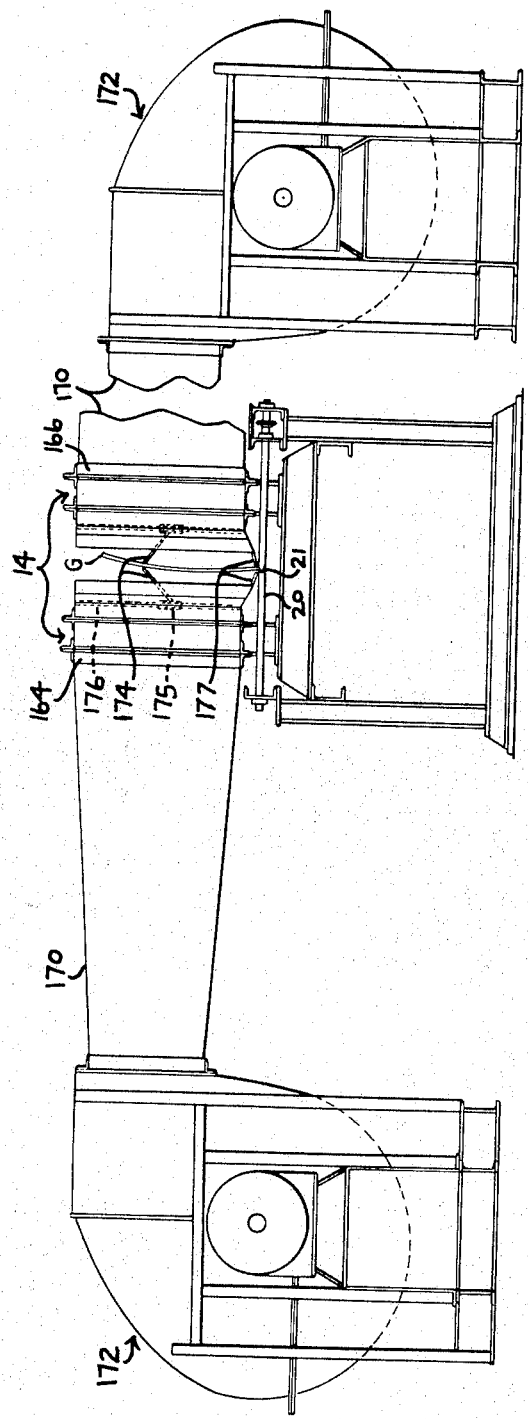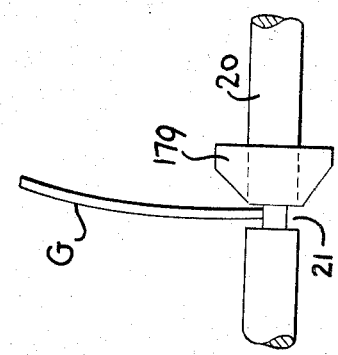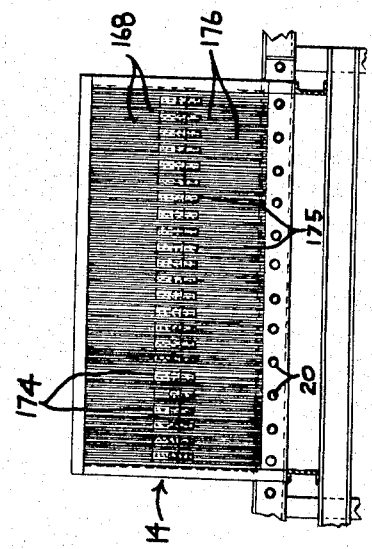

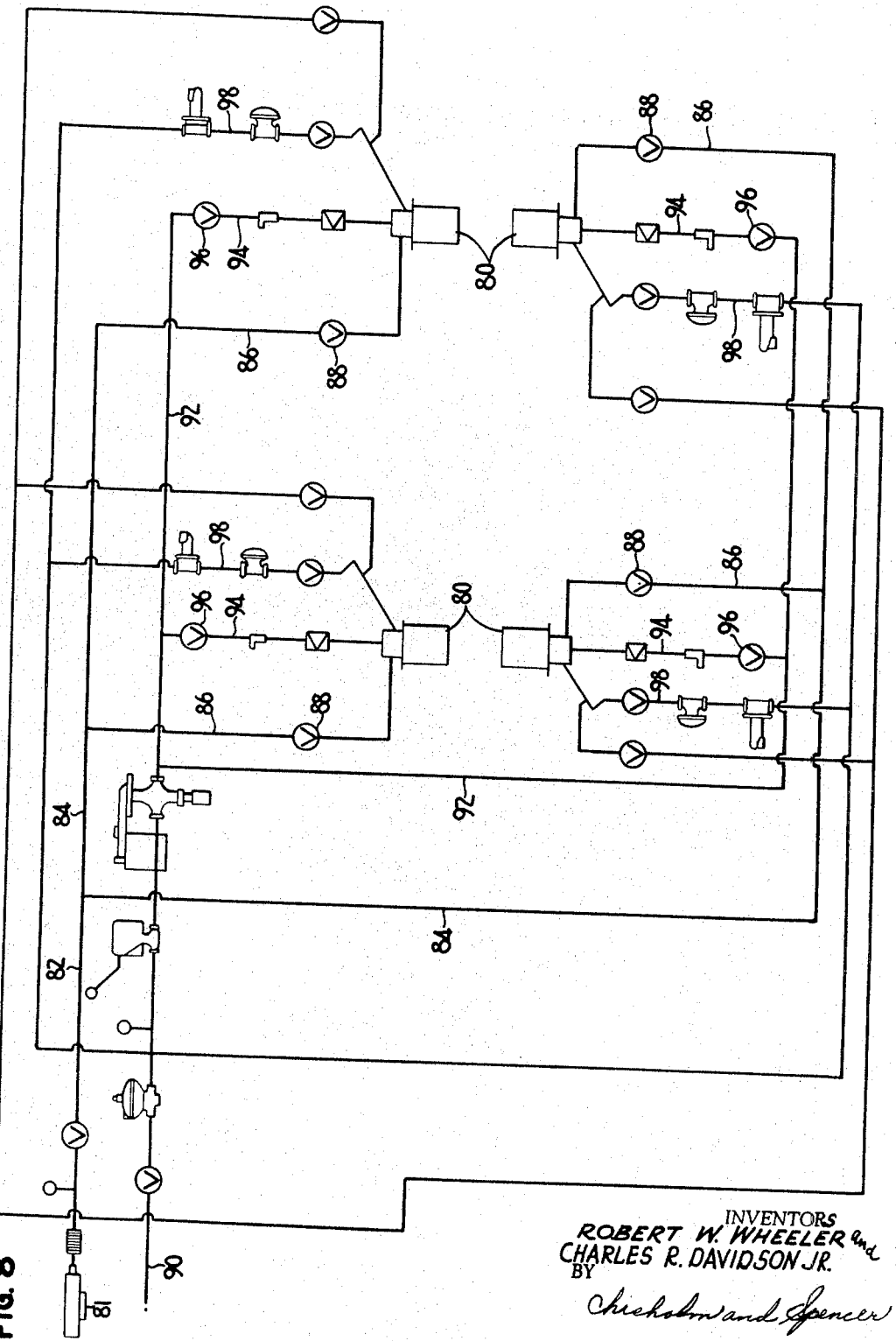

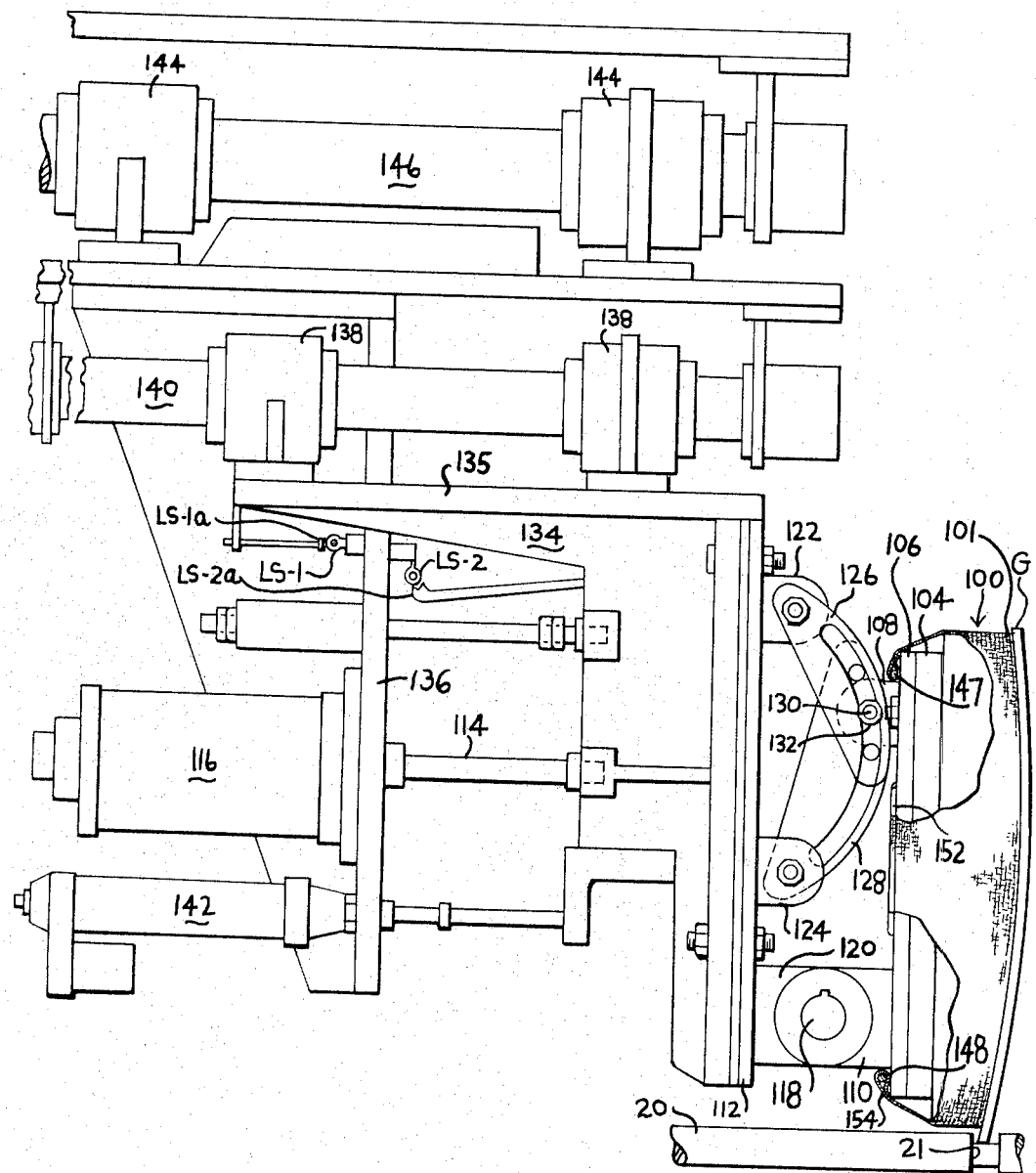

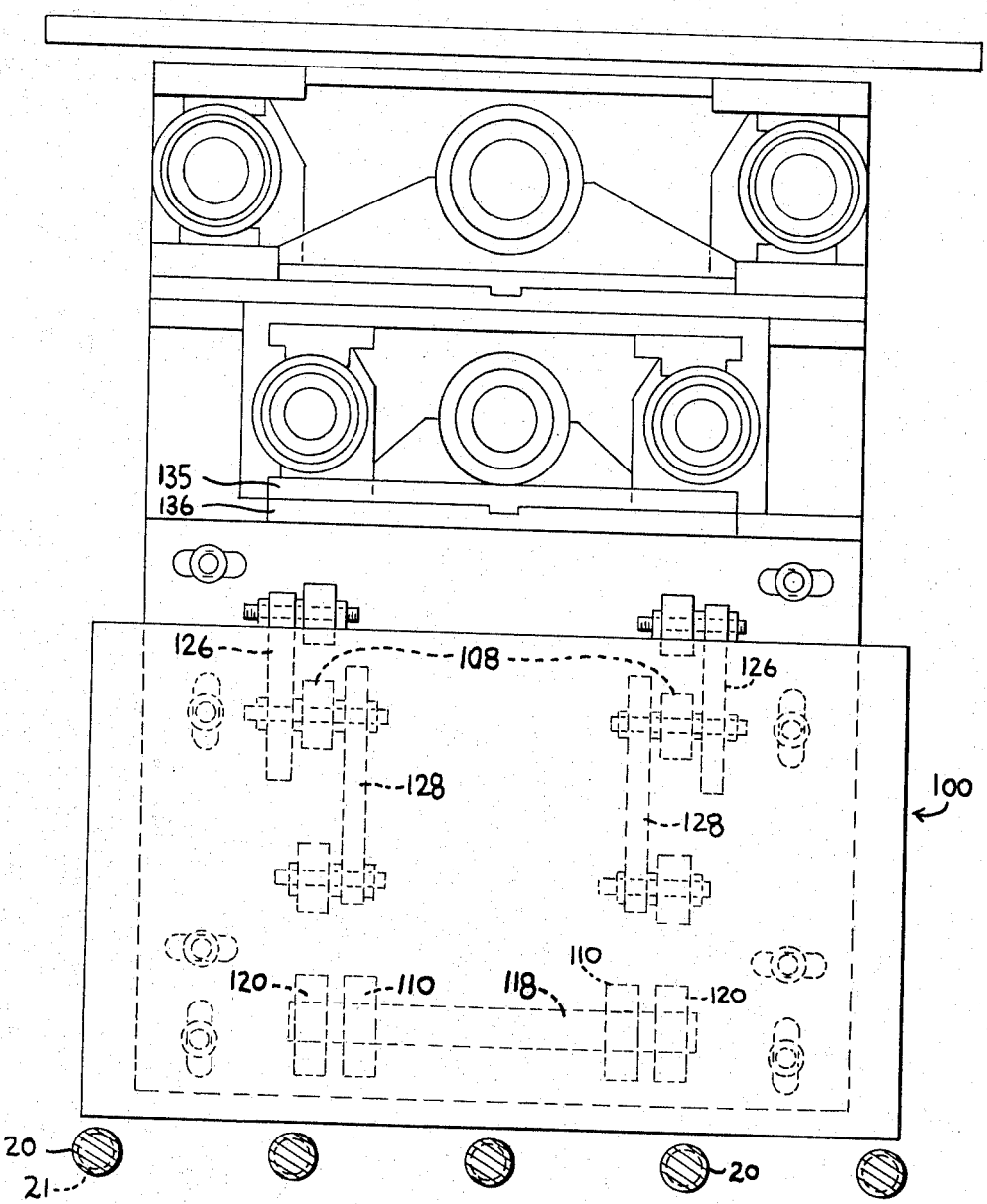

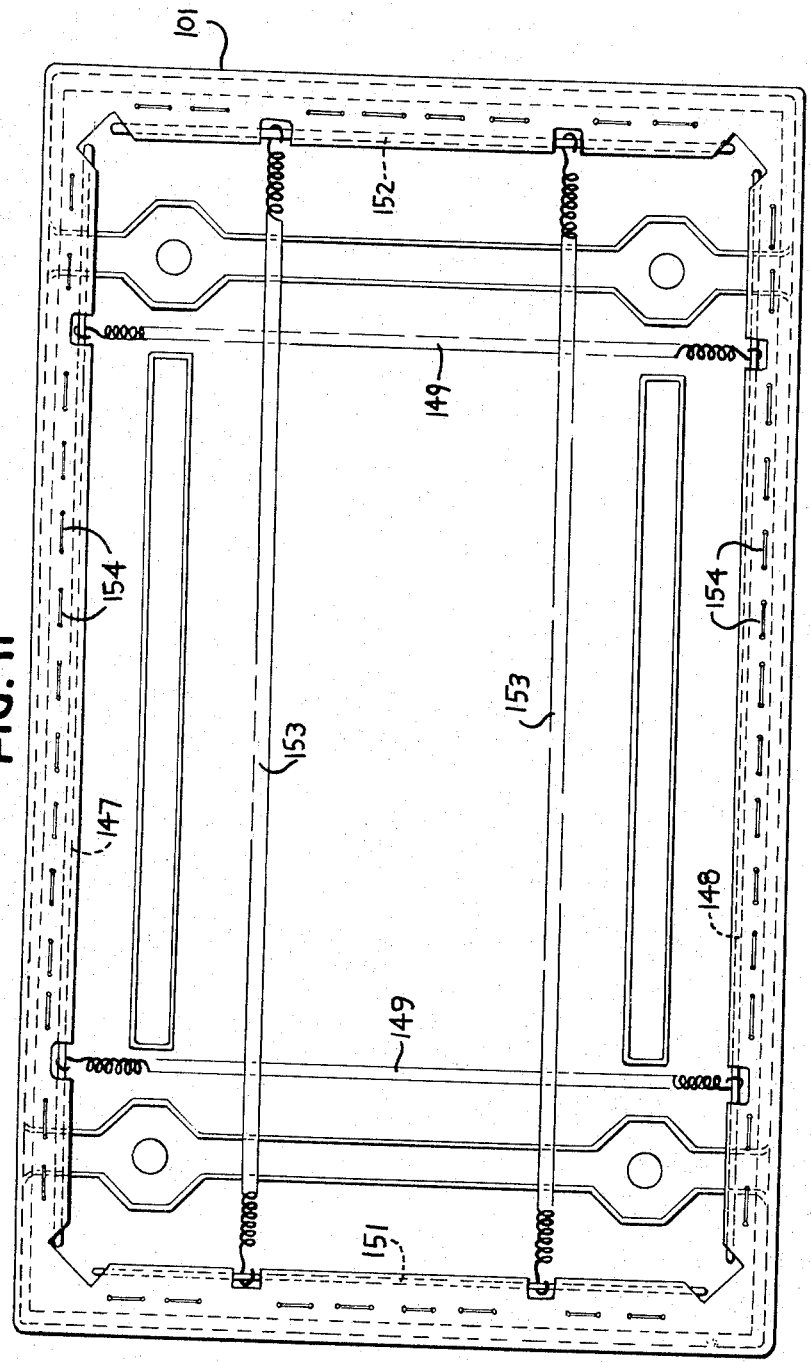

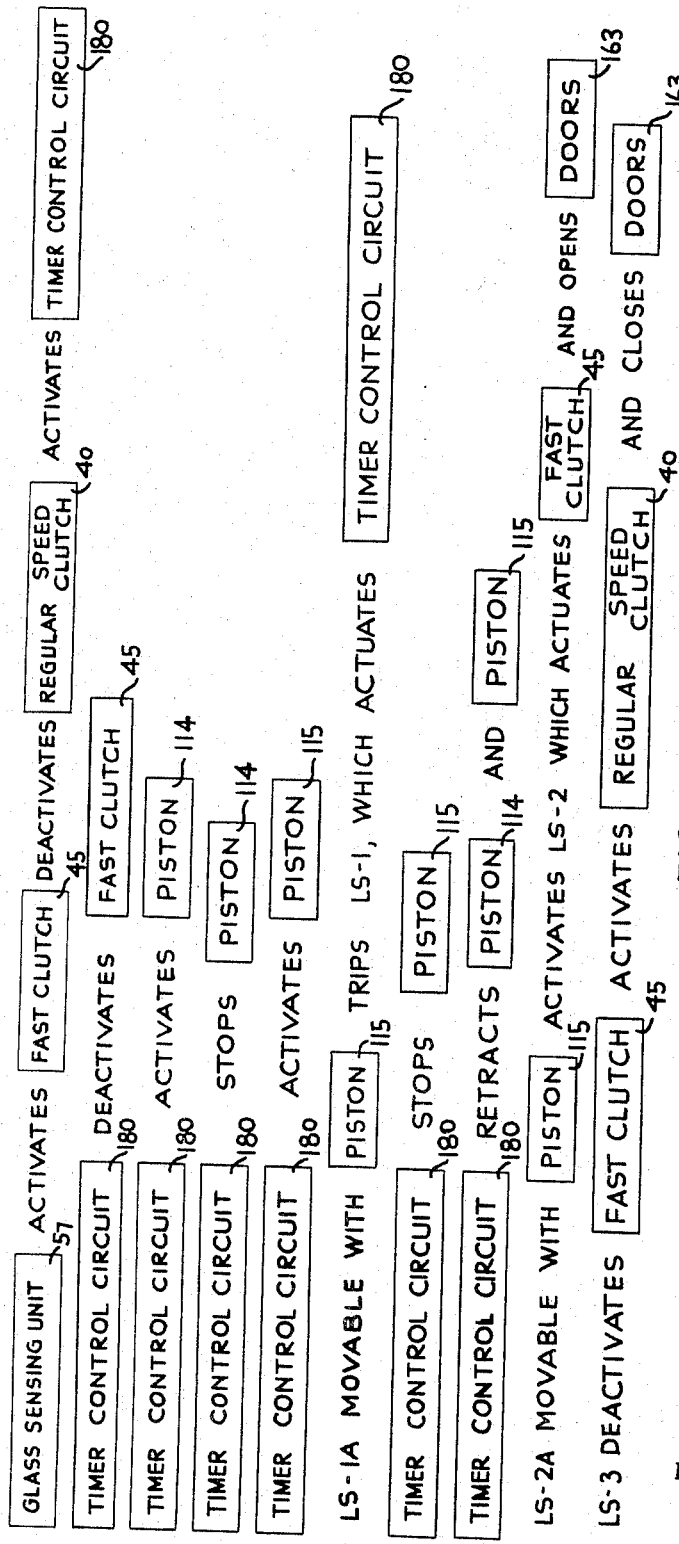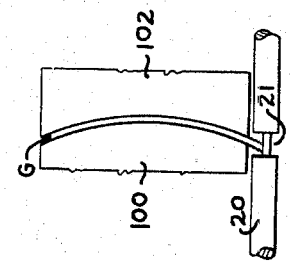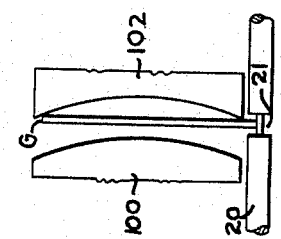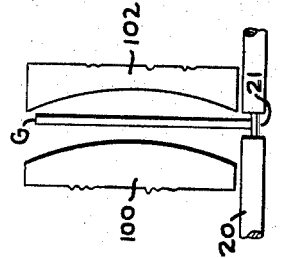

INVENTORS
ROBERT W. WHEELER and
CHARLES R. DAVIDSON JR.
BY Chisholm and Spencer
ATTORNEYS 3,341,312
METHOD OF SUPPORTING A THERMOPLASTIC SHEET WITH GAS
Robert William Wheeler, Pittsburgh, and Charles Richard Davidson, Jr., Natrona Heights, Pa., assignors to Pittsburgh Plate Glass Company, Pittsburgh, Pa., a corporation of Pennsylvania
Filed June 4, 1964, Ser. No. 372,653
13 Claims. (Cl. 65—25)

This application is a continuation-in-part of application Ser. No. 317,634 of Robert W. Wheeler and Charles R. Davidson, Jr., filed Oct. 21, 1963, for Sheet Treatment.

This invention relates to sheet treatment, and more particularly relates to handling glass sheets during bending and subsequent transportation of the bent glass sheets through a tempering station, although not necessarily limited to such treatment or to glass sheets.

Glass sheets have previously been bent and tempered by conveying the glass sheets through a hot atmosphere sufficient to raise the glass to a temperature above that at which the major surfaces or the contour thereof is changed by a deforming stress on contact with a solid. Hereinafter such a temperature will be referred to as the deformation temperature. For most commerical plate and window glass, this temperature is around 980 degrees Fahrenheit and above, but usually below a temperature at which the glass becomes molten.

Prior to the present invention, glass sheets were conveyed at high temperature by solid members that engaged the major surfaces of the glass sheet. This engagement resulted in undesirable deformation or marring of the major surfaces.

Recently a technique was developed for supporting and conveying hot sheets of flat glass. This development involves method and apparatus for supporting and conveying a sheet of glass in an upright position while the glass is at or above deformation temperature. According to the recent development, disclosed and claimed in application Serial No. 212,682 of Robert W. Wheeler, filed July 26, 1962, for Fabrication of Glass, now U.S. Patent No. 3,223,506, the flat glass sheet is physically supported at its lower edge and maintained in a substantially vertical plane by an upwardly directed flow of gas on each side of the upright sheet. This arrangement supports the glass against undesired deformation and eliminates the necessity for the major surfaces of the glass sheet to contact any solid object while the glass is at a thermal deformation temperature at which it can be marred or deformed or otherwise impaired. In this manner, the marring or distorting previously associated with flat glass fabricating processes has been eliminated while heating it at and above glass deformation temperature.

According to the present invention, novel methods have been provided for supporting glass in sheet form during various treatments such as required for conveying and/or heating and/or bending and/or thermally tempering of the glass.

According to this invention, it has been discovered that a sheet can be supported in balanced position merely by disposing said sheet in an upright position, with an edge thereof resting on a plurality of spaced supports, closely adjacent to an upwardly extending wall under circumstances so that there is gradually decreasing distance between the wall and one surface of the sheet and directing fluid between said one surface of the sheet and the wall in the direction of said decreasing distance. The sheet is thus supported due to the gas (fluid) thus flowing even though no fluid is directed along or against the opposite side of the sheet.

It has now been found that by directing the flow of a gas through such a space and in such direction, the glass sheet clings close to but spaced from the wall because of the differential pressure created on opposite sides of the glass. This differential pressure results from the flow of gas through the converging or decerasing space and thence into an expanded area. This manner of flow creates a pressure in the space which is lower than the atmospheric pressure on the opposite side of the sheet. Thus the sheet is urged toward the wall of the converging space but is held away from it by the flow of the gas and the glass is erectly supported without a balancing flow of gas on the other side of the glass.

As will become apparent from the ensuing disclosure, the space between the glass and the wall diverges beyond the converging space so that the gas flows through a restriction or throat and thence into an expanded area communicating with the atmosphere in contact with the opposite side of the sheet. This throat usually is at the level of the middle of the glass but may be above or below this height.

During bending of a glass sheet, for example, the sheet is supported between a pair of contoured glass shaping members, one of which has a convex shaping surface (that is, one having at least a portion protruding from its mean datum plane) and the other of which has a concave shaping surface (one having at least a portion receding from its mean datum plane). The shaping surfaces are complementary to one another. Specifically, the present invention supports the glass sheet at said glass shaping station by upward flow of hot gas between a convex shaping surface and one of the surfaces of the flat glass sheet prior to its engagement by a pair of shaping members. During shaping, the pressurized engagement by the glass shaping members maintains the glass sheet in vertical balance.

After the glass is shaped to its desired configuration and before it is tempered, the bent glass sheet is maintained in a substantially vertical orientation by upward flow of hot gas streams which flow between the major surfaces of the bent glass and the complementary curved shaping surfaces of the glass shaping members. In addition to supporting the shaped glass sheet in substantially vertical orientation, the hot gaseous streams retard cooling of the shaping surfaces of the shaping members and tend to equalize the heat loss throughout the glass surface during its contact and shaping by pressurized contact with the shaping members.

The bent glass sheets are maintained in vertical orientation during their tempering by moving the bent glass between flat, apertured, vertical walls of plenum chambers which impart opposing streams of cool air. The streams may be applied at a higher rate of flow against the convex surface of the bent glass sheet than against its concave surface.

It is particularly important that a vertical component of motion be imparted between the curved surfaces of the bent glass sheet and the flat vertical walls of the apertured plenum chambers facing the curved surfaces of the bent glass sheet. The rate of cold air flow against both surfaces must be sufficiently rapid to harden the surfaces quickly and sufficiently uniform to avoid marring and distortion.

In one of its broader aspects, the present invention contemplates providing a conveying system adapted for handling hot sheets without marring or otherwise producing uncontrolled deformation in the major surfaces, even when the sheets are at deformation temperature. The present invention provides means for supporting sheets by utilizing a Venturi effect between a curved surface and a relatively flat surface, one of which surfaces is provided by the sheet.

The flat glass sheet may be supported in a vertical position for conveyance through a heating furnace by flowing fluid upward between one surface of the flat glass and a convex surface of a heated wall that serves as a heat source while engaging the bottom edge of the sheet to restrain the sheet from lateral movement transverse to the path of conveyance. The minimum spacing between the glass and the wall depends on the rate of fluid flow and generally a greater minimum spacing is permitted with faster flows than with slower flows. In any event, the minimum spacing should be no more than about 1 inch, preferably less than ½ inch, say about ¼ inch or less.

When the glass sheet reaches the glass shaping station, it is stopped between contoured glass shaping members having complementary convex and concave shaping surfaces. A flow of gas is directed between the glass shaping members while the sheet is engaged at its lower edge to restrain the sheet from movement away from the walls provided by the shaping surfaces. Gas is supplied to the shaping station at the same or a lower temperature than to the furnace.

This gas flow is supplied rapidly and in consequence holds the glass sheet close to but spaced from the convex shaping member, and thus supports the glass in an upright position. Thus, the rapid flow of gas causes the glass to stand adjacent the convex shaping member without falling against it until the glass shaping members move toward one another into pressurized engagement with the heat-softened glass to shape the latter.

After bending, the glass shaping members are then retracted and the bent glass sheet, still supported only along its bottom edge by solid members, is subjected to movement of hot gas streams along its major surfaces and moved into a tempering station. At the latter station, tempering fluid is applied under pressure from apertured flat vertical walls of plenum chambers against the major surfaces of the bent glass sheet. A greater rate of flow may be applied against the convex surface than against the concave surface. Consequently the glass remains spaced from but is held erectly on its edge with its convex surface adjacent the apertured plenum wall it faces. The glass sheet continues to be conveyed on spaced rollers which support the bottom edge, restrain the sheet from movement away from the walls of the plenum chambers, and convey the glass during its tempering.

In accordance with an illustrative embodiment of apparatus conforming to the present invention, a gas supply chamber having an elongated upper slot opening provides an upward flow of gas between one major surface of the flat glass sheet within a restricted passageway formed in a tunnel-like furnace between said major surface and one of a pair of closely spaced, vertically disposed walls providing a narrow passageway for conveying the flat glass while the flow of gas is applied across said major surface. The furnace walls support radiant heaters which irradiate the glass.

Beyond the furnace lies a glass shaping station, the curved complementary shaping surfaces of whose glass shaping members form walls of a restricted passageway for the glass sheet and the upward flow of gas is applied across said major surface from another gas supply chamber beneath said shaping station. Actuating means move the glass shaping members into pressurized contact with a glass sheet when a glass sheet is located therebetween and retract the glass shaping members out of engagement with the glass sheet after it is shaped to permit the conveyor to transport the glass sheet into a tempering station located beyond the glass shaping station.

In the tempering station, a plenum chamber having a flat apertured inner wall is disposed on each side of the restricted passageway. A series of spaced nozzle openings or apertures are provided for the inner wall of each plenum chamber facing the restricted passageway, means are included for providing quenching fluid under superatmospheric pressure to the plenum chambers for exhaust through said series of apertures, and means are provided between said plenum chambers to impart a vertical component of motion to the quenching fluid imparted from said plenum chambers. The flow may be applied at a higher rate against the convex glass surface than against the concave glass surface to maintain the bent glass sheet in vertical balance while conveyed through the tempering station.

A plurality of conveyor rolls are horizontally aligned and located directly beneath and between the bottom portion of the vertical walls of the furnace, beneath and between the restricted passageway between said plenum chambers to support the glass sheet along its bottom edge only for movement through the furnace, shaping station and tempering station. The rolls are provided with circumferential grooves aligned along a longitudinal axis defining a path of movement for the glass sheets. The glass sheets are supported in the longitudinal grooves during their movement along the conveyor and restrained from lateral movement at their lower edge thereby.

The present invention is particularly well adapted to bend and temper glass sheets in which the thickness is small relative to the length and width. The thickness generally ranges from about ⅛ inch or less up to ½ to 1 inch. The width ranges up to about 2 to 3 feet and the length ranges upwards from 3 to 6 feet. The present apparatus can also handle smaller sheets than those specified herein.

When said sheets are supported vertically during their transport through the furnace, the heat transfer resulting from the simultaneous irradiation and hot gas flow permits the glass sheets to be heated quite rapidly to deformation temperature. The gas flow in the glass shaping station helps support the glass sheet vertically while it occupies the glass shaping station and also helps maintain a uniform surface temperature throughout the glass sheet prior to its being tempered.

In the tempering station, cold tempering fluid directed at and along the glass surfaces causes the glass to cool or quench rapidly at its surfaces while maintaining the vertical disposition of the glass. The cooling effect on each side is substantially equal despite the slightly different rates of flow needed to balance certain shapes because of the concavity of one surface and convexity of the opposite surface.

Heat transfer from the two major surfaces continues rapidly until the entire body is cooled to below its annealing range. When the glass reaches this relatively cold temperature, a permanent stress pattern or temper has been established in the glass sheet.

The advantages of the present invention will be appreciated from the following detailed description of an illustrative embodiment described and claimed in copending application Serial No. 317,634 with emphasis on variations thereof that comprise the present invention. In the drawings which accompany the description, and in which like reference numerals are applied to like structural elements, FIG. 1 is a longitudinal side elevation of an illustrative embodiment of apparatus described and claimed in said copending application;

FIG. 2 is a fragmentary plan view partially in horizontal section of the assembly disclosed in FIG. 1 particularly emphasizing the conveyor drive system;

FIG. 3 is an end elevation along the lines III—III of FIG. 1;

FIG. 4 is a section along the lines IV—IV of FIG. 1, with parts broken away to show certain structural elements of the furnace construction;

FIG. 5 is a sectional view of the glass shaping station taken along the lines V—V of FIG. 1;

FIG. 6 is a sectionalized view of the end of the quenching station taken along the lines VI—VI of FIG. 1;

FIG. 7 is a front view of a plenum chamber of the tempering station;

FIG. 8 is a schematic diagram of air supply and gas supply lines for the burners supplying hot air-gas mixture to the furnace or the shaping station;

FIG. 9 is an enlarged detailed end view partly in section of one of the glass shaping members and its actuating means operatively connected thereto;

FIG. 10 is a front view of the glass shaping member of FIG. 9;

FIG. 11 is a rear view of the glass shaping member of FIG. 9 showing how its fiber glass cover is attached;

FIG. 12 is a chart showing the sequential operation of the moving elements and their actuating means;

Figure 17:
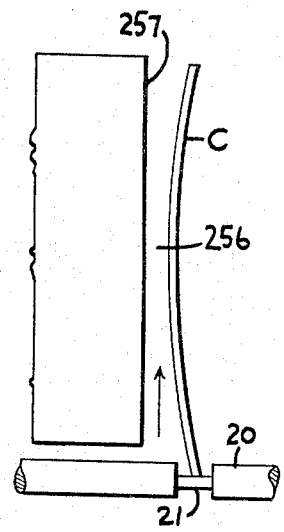
Figure 18:
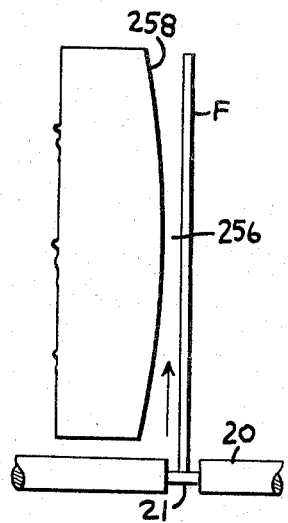
Figure 19:
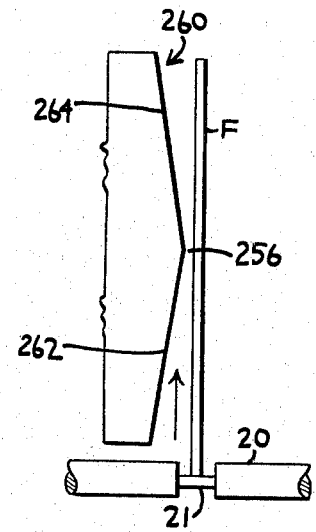
Figure 20:
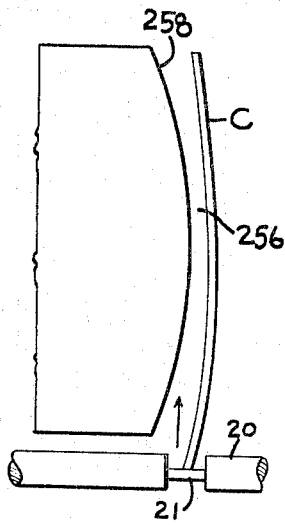
Figure 21:
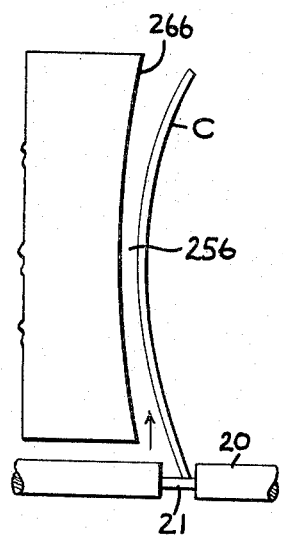

FIGS. 13, 14, and 15 are fragmentary, schematic views showing three sequential stages of a glass shaping operation;

FIG. 16 is an enlarged fragmentary view of a collar employed with the conveyor rolls in the tempering section;

FIG. 17 is a schematic view showing how the principle of the present invention may be employed to transport a curved sheet along a single wall while supported along its bottom edge;

FIG. 18 is a schematic view showing how the principle of the present invention may be employed to transport a flat sheet supported along its bottom edge adjacent a wall constructed to have gradually decreasing distance from the flat sheet in the direction of fluid flow so as to provide a Venturi effect;

FIG. 19 shows an alternate embodiment of the FIG. 18 construction for balancing, supporting, and conveying flat sheets; and FIGS. 20 and 21 show additional embodiments of a single convex wall and a single concave wall used to transport curved sheets.

Referring to the drawings, FIGS. 1 and 2 illustrate a general assembly of apparatus conforming to the invention described and claimed in the aforementioned copending application Ser. No. 317,634 for heating, bending and tempering glass sheets.

The apparatus comprises a run-in section 11, a furnace 12, a glass shaping station 13, a tempering section 14, and a run-out section 15 arranged in end-to-end relation.

Run-in section 11 comprises a plurality of horizontally aligned supporting rolls 20 provided with circumferential grooves 21 aligned longitudinally with the apparatus. Rolls 20 are supported for rotation in journal blocks 22 fastened on horizontally aligned parallel channels 23 and 24 extending longitudinally of the run-in section.

Vertical posts 25 resting on horizontal I-beams 26 support the parallel channels 23 and 24. Additional reinforcing members, such as an I-beam 34 (FIG. 3), interconnect posts 25 if additional structural rigidity is desired.

Cantilever members 27 (FIGS. 1 and 3) interconnect channels 23 or 24 with one of a pair of roller support frames 28. Each roller support frame 28 comprises a pair of posts 29, an upper angle iron 30, and a lower angle iron 31, interconnecting the posts.

Free running rolls 32 are rotatably mounted on vertical stub shafts 33 supported by the upper and lower angle irons. The roller support frames 28 are symmetrically located on opposite sides of a vertical plane intersecting the grooves 21 of rolls 20. The diameter of the free running rolls 32 is identical and sufficiently less than the distance separating the vertical stub shafts 33 to provide a space therebetween to permit clearance for the thickness of the glass sheet being processed. The latter space is aligned in a vertical plane which forms a path of travel for glass sheets through the apparatus.

As shown in FIG. 3, a glass sheet G rests with its bottom edge supported in grooves 21 while it is balanced between spaced pairs of opposed free running rolls 32. The grooves 21 restrain the lower edge of the glass sheet from movement. A slotted bracket 35 interconnects the inner ends of each pair of laterally opposed cantilever members 27. The slots in the brackets 35 provide clearance for the bottom edge of glass sheets conveyed along the circumferential grooves 21 of successive rolls 20.

Additional conveyor rolls 20 circumferentially grooved at 21 form a continuation of the conveyor for supporting and propelling the bottom edge of glass sheets through the furnace section 12, the shaping station 13, the tempering station 14 and the run-out section 15 disposed in end-to-end relation beyond the exit end of the run-in section 11.

All the conveyor rolls 20 are driven by a drive motor 36 through suitable reduction gearing 37 and chain drive connections to a main chain drive 38, which directly drives the rolls 20 in the run-in section 11, the entrance portion of the furnace section 12, the exit section of the tempering section 14 and the run-out section 15. A bypassing portion 39 of the main chain drive interconnects the drive for the rolls in the run-out section 15 with those in the run-in section 11.

The remaining rolls may be selectively coupled through a clutch 40 on a shaft 41, a drive chain 42, a shaft 43, and an intermediate conveyor chain drive 44 to rotate the bypassed rolls at the exit end of the furnace section 12, the entrance end of the tempering section and throughout the glass shaping station 13 at the speed of the other conveyor rolls 20. Alternatively, the bypassed rolls may be driven at a higher speed through the intermediate chain drive 44, by engaging a clutch 45 mounted on a high speed shaft 46 coupled to the main chain drive 38 through coupling means 47 comprising stub shafts, sprockets and connecting chains which cause high speed shaft 46 to rotate at about ten times the rotational velocity of the rolls and shafts rotatably driven by the main chain drive 38.

The furnace section 12 (FIGS. 1, 2, and 4) comprises a longitudinally extending tunnel-like furnace generally indicated at 50 comprising closely spaced vertical walls 51 extending upward from the horizontal plane occupied by the conveyor rolls 20 and disposed on opposite sides of the row of the aligned grooves 21 of rolls 20.

A plenum chamber 52 (FIG. 4) is formed by suitable insulating blocks in the lower portion of the furnace beneath the conveyor rolls 20. The blocks extend the entire length of the furnace 50. Plenum chamber 52 is relatively wide in its bottom portion and tapers in width upwardly to form a narrow elongated slot opening 53 at the upper portion of plenum chamber walls 54. Slot opening 53 extends lengthwise of the furnace 50 and communicates between the plenum chamber 52 and a restricted passageway 55 for glass sheets between the furnace walls 51 above the grooved rolls 20.

Vertically arranged electrical resistance heating elements 56 are mounted in the facing surfaces of walls 51 to direct radiant energy onto the restricted passageway 55. Suitable heaters for this use are 1,000 watt electrical heating elements Model 56TS sold by the Heavy Duty Electric Company of Watertown, Wis.

The circumferential grooves 21 of the rolls 20 in the furnace 50 are aligned vertically with the elongated slot opening 53 of the plenum chamber 52 and the restricted passageway 55 between the furnace walls 51 and are centrally located with respect to the vertical passageway 55. The passageway 55 is wider than the groove.

Near the end of the furnace 50 is mounted a glass sensing unit 57 comprising an ultrasonic generator mounted on one wall 51 to generate sonic vibrations toward the other wall 51 in a direction parallel to the longitudinal axes of the rolls 20, and an ultrasonic sensing unit mounted in the opposite wall facing the generator. When the leading edge of a vertically supported glass sheet moves between the generator and the sensing unit, it trips a timing circuit that controls the operation of several elements of the apparatus, as will be described in detail later. A suitable glass sensing unit is sold under the trade name of Sonac by the ARO Corporation of Bryan, Ohio.

The plenum chamber 52 is substantially coextensive in length with the length of the furnace 50. This permits the elongated slot opening 53 to provide communication between the plenum chamber 52 and the restricted passageway 55 throughout the entire length of the furnace 50.

A plurality of burners 80 are located in spaced relation along both sides of the plenum chamber 52 to supply hot gases under pressure thereto. Alternate burners extend through passageways 58 located in staggered relation along the length of each opposite side wall 54 of the plenum chamber 52.

Baffle walls 59 extend obliquely downward and laterally inward from the sloping roof of the plenum chamber 52 to insure a turbulent flow of hot gases within the plenum chamber 52. Each baffle wall 59 extends substantially the entire length of the plenum chamber.

To supply air under pressure to the hot gas support combustion system, one or more blowers 81 (FIGS. 4 and 8) are employed to feed air under pressure through a conduit 82 to a pair of manifolds 84. As best shown in FIGS. 1 and 4, each individual burner 80 is supplied with air from a manifold 84 through a conduit 86, each provided with a valve 88.

Combustible gas from a main 90 (FIG. 8) is introduced through branch conduits 92 into each burner 80 via gas conduits 94, each individually valved as at 96.

Each burner 80 is of the so-called nozzle mix, excess air heater type. Combustible gas is mixed with an excess of air within each burner and is ignited by a pilot burner supplied through a suitable pilot line 98. Burners suitable for use in apparatus described herein are preferably of the type known as North American Series 223 GXSA gas burners, manufactured by the North American Manufacturing Company of Cleveland, Ohio.

The combustion of the products in the combustion chamber of the burner supplies the plenum chamber 52 with heated gas at a uniform temperature and pressure through the passageways 58 in the plenum chamber walls 54. Adequate control of pressure and temperature is provided by correlating the rates of input of air and fuel through the furnace. An upward pressure of 1 ounce per square inch and less is sufficient to support most commercial sizes of glass sheets fabricated for automobile sidelights.

The total supply of air and fuel is enough to affect the desired support under normal conditions. The amount of fuel used is determined by the amount of heat needed to raise the glass surface temperature to the desired level. Normally an excess of air is used over that required for complete combustion of the fuel gas. The supply of excess air and fuel may be varied to change the pressure in the plenum chamber 52. A mixture of heated air and combustion products escapes upwards through the vertical passageways 55 between the furnace walls 51.

FIGS. 5, 9, 10, and 11 disclose the details of the glass shaping station 13. FIG. 5 shows a pair of shaping members, including a convex shaping member 100 having a convex shaping surface disposed about a horizontal axis of curvature and a concave shaping member 102 having a concave shaping surface complementary to the convex shaping surface of the shaping member 100, also disposed about a horizontal axis of curvature. The shaping members are made of carbon steel or other suitable material, such as hard wood, and covered with knit fiber glass cloth covers 101 (FIG. 11).

The rear of both glass shaping members 100 and 102, as shown in FIGS. 5 and 9, is connected to an adapter plate 104 of suitable insulating material, such as Marinite (Registered Trademark).

Marinite is a registered trademark of the Johns-Mansville Company and is used by them to designate a specific lime silicate bonded porous refractory composition. A representative analysis of Marinite is substantially as follows in percent by weight:

| | |
|---|---|
| $SiO_2$ | 50.64 |
| $Fe_2O_3$ (total iron) | 17.80 |
| $Al_2O_3$ | 6.28 |
| CaO | 10.77 |
| MgO | 4.86 |
| $Na_2O$ | 0.66 |
| $SO_3$ | 0.12 |
| Loss on ignition | 9.90 |
| Total | 101.03 |

An aluminum plate 106 having upper extension ears 108 and lower extension ears 110 is fixed to the rear of the adapter plate 104.

A mounting plate 112 is rigidly attached to the forward end of a piston 114 of an air cylinder 116. The convex shaping member 100 and its attached structure 104, 106, 108, and 110 are pivotally attached with respect to the mounting plate 112 about a pivot rod 118 carried by the lower extension ears 110 attached to the rear of the shaping member 100 and additional ears 120 attached to the mounting plate 112.

The concave glass shaping member 102 is actuated for movement by a piston 115 of an air cylinder 117. Both pistons 114 and 115 are actuated by a timer control circuit in a sequential manner to be described below.

In order to adjust the angular orientation of the shaping surface of the shaping member 100 with respect to mounting plate 112, an upper mounting block 122 and a lower mounting block 124 are rigidly attached to and extend forward of the backing plate 112. An upper scissor-like arm 126 is pivotally attached to a bearing carried by the upper mounting block 122 and an additional scissor-like arm 128 is pivotally supported by a bearing carried by the lower mounting block 124.

The scissor-like arms 126 and 128 are provided with arcuate slots at their forward ends. These arcuate slots receive a bolt 130 which extends through the upper bearing block 108. A lock nut 132 is used to tighten or loosen the bolt 130 and permit the scissor arms 126 and 128 to be pivoted about their respective pivots in the mounting blocks 122 and 124 to adjust the horizontal position of bolt 130, and, hence, the orientation of the backing plate 106 and its attached glass shaping member 100 with respect to the pivot rod 118. A similar arrangement exists for pivoting the other glass shaping member 102 with respect to its actuating piston.

A vertical gusset 134 and a horizontal plate 135 extend rearward of the backing plate 112 for supporting actuators LS–1A and LS–2A for limit switches LS–1 and LS–2, respectively. The limit switches are mounted on a vertical wall 136 of an angle member carried by the support structure for the concave glass shaping member.

The limit switches and their actuators are so located that limit switch LS–1 is actuated on inward movement of the glass shaping member 100. LS–1 actuates time-delay circuits that control the time that the glass shaping members are maintained in pressing engagement against the opposite surfaces of the glass sheet and initiate their retraction after a suitable time interval. Limit switch LS–2 is actuated when the shaping members are retracted from one another to actuate the high speed clutch 45 and also to open a pair of doors 163 at the entrance of the tempering station 14 so as to insure a rapid removal of the bent glass sheet from the shaping station to the tempering station.

The horizontal plate 135 supports bearing housing 138. The bearings in said bearing housings slide along a support rod 140 whenever the glass shaping members are moved relative to one another by actuation of the air cylinders 116 and 117 causing pistons 114 and 115 to move. A suitable check valve 142, preferably a Hydrocheck Model #HC–12B–142, manufactured by Bellows Valvair Division of International Basic Economy Corporation, Akron, Ohio, is used with each air cylinder to insure that the movement of the shaping members toward the glass is slowed down at the last movement of inward movement.

The support structure for the movable glass shaping members including the slide rod 140 is in turn supported in sliding relation by sleeve bearings 144 on a support rod 146 to enable the entire assembly to be retracted a sufficient distance to replace the glass shaping members whenever a production change requires such change in said shaping members.

The knit fiber glass cloth covers 101 of the glass shaping members 100 and 102 are tightly mounted against the shaping surfaces and are lapped to the rear of the aluminum backing plate 106. As best seen in FIG. 11, the upper edge of the cover is lapped about an upper horizontal rod 147 and the lower edge of the cover member lapped about a lower horizontal rod 148. Springs 149 interconnect rods 147 and 148 to provide means for maintaining the vertical dimension of the fiber glass cover of the shaping member in unwrinkled condition against the shaping surfaces of the glass shaping member. The side edges of the cover member are lapped about additional vertical rods 151 and 152 interconnected by horizontal springs 153 to maintain the horizontal dimension of the fiber glass cloth cover unwrinkled against the shaping surface of the shaping member.

Each of the four sides of a fiber glass cover is lapped over one of the rods 147, 148, 151, or 152. The lapped portion is attached to the rods by staples 154. The rods are positioned to the rear of the backing plate and interconnected by the springs 149 and 153 as shown in FIG. 11.

The glass shaping station 13 also comprises a pair of closely spaced flat vertical walls 157 extending from the end of the furnace to adjacent the position occupied by the glass shaping members 100 and 102. The flat vertical walls 157 enclose an extension of the restricted passageway 55 for the furnace section 12. Curved walls 158 extend beyond the glass shaping members 100 and 102 toward the tempering station 14. The space between the curved walls 158 is aligned with the restricted passageway 55 so as to provide a further extension of a restricted passageway for transporting the glass sheets after they are shaped. Walls 158 are shaped similar to the shaping members 100 and 102 and comprise a convexly shaped wall spaced from a concavely shaped wall.

An additional plenum chamber 160 constructed in a manner similar to plenum chamber 52 lies under the glass shaping station 13. An upper elongated slot opening 162 at the top of additional plenum chamber 160 is aligned with the circumferential grooves 21 of the conveyor rolls 20 within the glass shaping station. The glass shaping members 100 and 102 are so arranged that in the closed position the lowermost portion of the shaping surfaces are aligned in the same vertical plane as the elongated slot opening 162 above the lower plenum chamber 160.

A system of burners and air blowers similar to that provided for the plenum chamber 52 beneath furnace 50 is supplied for the plenum chamber 160 beneath glass shaping station 13. Hence, their details are not repeated in this portion of the description.

The tempering station 10 is best understood from FIGS. 1, 6, 7, and 16 and extends in end-to-end relation beyond the glass shaping station 13. A pair of doors 163 actuated by motors (not shown) normally separates the tempering station 14 from the glass shaping station 13.

Plenum chambers 164 and 166 are rigidly supported along the length of the tempering station 14. The plenum chambers are located on each side of the vertical plane of travel for the glass being conveyed.

Each plenum chamber has spaced, opposed, slotted openings 168 disposed in flat vertical walls spaced from one another along the direction of glass travel. The slotted openings 168 are horizontally spaced from one another along the direction of glass travel. These slots extend the entire vertical height of the conveying path. The space between the slots forms an additional extension of the restricted passageway 55 and the space between the flat walls 157, the glass shaping members 100 and 102 and the curved walls 158.

Conduits 170 supply the plenum chambers 164 and 166 with cold air from blowers 172. This cold air is supplied at a suitable rate of flow and pressure to temper the bent glass sheet passing through the tempering station 14 between the opposed openings 168.

In order to provide a vertical component of air flow sufficient to maintain the glass sheets in a fixed vertical position and to enable the air blasts heated upon contact with the glass to escape, oblique baffles 174 extend inward and upward from sleeves 175 adjustably secured to vertical posts 176. Each of the latter is attached to a plenum chamber reinforcement (not shown) between adjacent vertical slots 168.

The oblique baffles 174 are located intermediate the upper and lower extremities of the plenum chambers. In addition, additional baffles 177 extend inward from the bottom of the slot openings 168 between the latter to restrict the bottom opening of the passage through the tempering station 14.

The top of the passage between the plenum chambers is open to permit ready escape of heated air after it has been heated upon contact with the glass sheet. The combination of structural elements recited above promotes an upward component of air flow in the tempering station 14 along the opposite surfaces of the vertically oriented bent glass sheets conveyed through the tempering station.

With special reference to FIG. 16, a special collar 179 of truncated conical shape is mounted on each conveyor roll 20 in the tempering section 14. The collars 179 are located adjacent each slot 21. The radius of the collar is smallest adjacent the slot and increases axially of the attached roll 20 in the direction of the side occupied by the convex shaping member. The collars 179 cooperate with the grooves 21 to restrain movement of the lower edge of the curved glass sheet. The collars 179 are needed in the case where glass sheets are bent about their vertical as well as their horizontal axes.

A limit switch LS–3 is positioned inward of the leading edge of the tempering station 14 for actuation by the leading edge of a glass sheet to simultaneously deactivate the high-speed clutch 45 and activate clutch 40 so as to permit the intermediate portion of the conveyor to propel glass sheets forwardly at the regular conveyor speed provided by the main conveyor chain drive 38. Limit switch LS–3 also closes the doors 163 at the entrance to the tempering station 14.

FIG. 12 shows a program of the operation of the controls for the various moving elements of the conveyor and the shaping members. When a flat glass sheet is disposed between the transmitter and sensor of the glass sensing unit 57 in the furnace 50, a timer control circuit 180 immediately actuates the fast clutch 45 and deactivates the regular speed clutch 40. The timer control circuit 180 also controls the opening of doors 163 for the time interval needed to remove a glass sheet that has just been shaped from the glass shaping station 13 to the tempering station 14. The bent glass sheet is immediately ahead of the flat sheet whose presence was sensed by the glass sensing unit 57.

After a predetermined time determined by how long it takes the flat glass sheet to reach a position of alignment between the glass shaping members, the timer control circuit deactivates the fast clutch 45. The regular speed clutch remains deactivated so that the glass sheet is stopped between the glass shaping members.

At that time, the timer control circuit actuates the pistons 114 and 115 to cause the glass shaping members to move toward one another in a desired sequential arrangement. A preferred sequence of operations is shown in FIGS. 13 to 15.

Initially, as shown in FIG. 13, the flat glass sheet G is spaced about ⅛ inch to ³⁄₁₆ inch from the convex shaping member 100. The concave shaping member 102 moves inward into contact with one surface of the flat glass sheet while the convex shaping member 100 remains in spaced relation, as depicted in FIG. 14. Then, the convex shaping member 100 is brought into pressurized contact with the glass sheet, preferably at a pressure of about 1 pound per square inch. Gas is flowed upward continuously from plenum chamber 160 during the shaping operation. The pressing position of the glass shaping members is shown in FIG. 15.

As one of the glass shaping members moves toward the glass sheet, it actuates limit switch LS–1. This limit switch initiates a timing circuit which determines the stopping and the holding of the glass shaping members with a glass sheet sandwiched between and determines the period at which the glass shaping members are retracted from pressurized contact with the glass.

As the glass shaping member retracts, it actuates limit switch LS–2, causing a relay in a relay control 182 to energize the fast clutch 45 and opens the doors 163. This causes the bent glass sheet to be moved from the glass shaping station 13 into the glass tempering station 14 at a high speed.

When the leading edge of the glass sheet contacts limit switch LS–3, the latter closes the doors 163, deactivates the fast clutch 45 and reactivates the regular speed clutch 40. When the next glass sheet to be treated reaches the position of alignment between the transmitter and the sensor of the glass sensing unit 57, the cycle is repeated.

The following are examples, by way of illustration only, of preferred modes of operating the apparatus disclosed herein as applied to the bending and tempering of automobile sidelights having a cylindrical shape and $3/16$ inch thick, 18 inches high, 23 inches long, bent to a uniform radius of curvature of 60 inches about an axis disposed horizontally.

Glass sheets were loaded onto the run-in section 11 and disposed in proper vertical alignment upon the grooves 21 of the rolls 20 by engaging the upper portions between rollers 32. In this manner, glass sheets were conveyed seriatim into the furnace 50 where their movement was continued while supported on the circumferential grooves 21 of the additional rolls.

The temperature of the heating coils 56 was maintained at a temperature of 1350 degrees Fahrenheit, except for the two sets of elements at the entrance and exit ends of the furnace, which were maintained at 1200 degrees Fahrenheit. The temperature of the gases within the plenum chamber was maintained between 1240 and 1250 degrees.

The gas was furnished at a rate of 72 cubic feet per hour at standard flow per foot length of the furnace. The normal operating ratio of air to gas was 45 to 1 for the mixture supplied to the furnace.

Glass sheets were conveyed through a 6 foot long furnace in about 3 minutes. During this time, the glass sheets reached a surface temperature of 1220 degrees Fahrenheit.

The high-speed conveyor sections transferred the glass from the furnace to the tempering station at a speed of 20 feet per minute. The retracted convex shaping member was maintained between $1/8$ and $1/4$ inch from the glass surface by the flow of hot gases directed upward from the plenum chamber 160 disposed below the shaping members between the glass and the member. The temperature within the plenum chamber 160 was maintained between 760 and 800 degrees Fahrenheit. The glass was supplied in the plenum chamber 160 at a rate of 108 cubic feet per hour per foot length of shaping station and a normal operating ratio of air to gas of 70 to 1 to provide the proper supply of gaseous mixture in this station.

The pressure applied to shape the glass was about 1 pound per square inch.

In the tempering station, air at room temperature was supplied at 7 ounces per square inch plenum pressure against the convex surface and 6 ounces per square inch plenum pressure against the concave surface. The nozzles were of uniform width top to bottom, $3/16$ inches wide and spaced 3 inches center to center. The high speed conveyor moved the glass at 10 times the speed of the regular conveyor.

The rate of air and fuel flow is dependent upon furnace length and independent of the height or vertical dimension of the glass sheet treated, up to glass sheets having a height of about 3 feet.

In the tempering station, air was supplied through the nozzle orifices at a rate of about 560 cubic feet per minute per square foot of area against the convex side of the bent glass sheet and about 480 cubic feet per minute per square foot of area against the concave surface. As the glass travelled through the tempering station, the surface temperature was lowered through the annealing range in less than 2 seconds. By the time the glass reached the run-out section 15, which is the mirror image of the run-in section 11, the glass was sufficiently below deformation temperature to permit its contact with solid elements at its major surfaces.

Glass sheets bent and tempered according to the method and using the apparatus described hereinabove had a stress, in terms of the center tension thereof indicated by a birefringent effect of the glass on polarized light waves, of approximately 3200 millimicrons per inch of glass length as measured by standard techniques using a polariscope.

The walls 51 within the furnace 50, the flat walls 157 and the curved walls 158 of the glass shaping station 13 and the inner slot openings 168 of the tempering station 14 were spaced on opposite sides of the path of movement of the glass with about $3/4$ inch space between the opposing walls for treating glass sheets $3/16$ inch thick.

A typical embodiment of the invention described and claimed in the aforementioned copending application Serial No. 317,634 has been described hereinabove. Five additional embodiments applying the invention herein contemplated to hold erect a sheet guided and supported by directing fluid between a major surface of said sheet undergoing treatment and a wall closely adjacent to said surface under circumstances so that there is gradually decreasing distance between said wall and said surface in the direction of said decreasing distance, for movement along spaced grooved rollers that support and propel the sheets are shown in FIGS. 17 through 21. In all these additional drawings, reference number 256 is applied to the throat or restriction in the space between the wall and the sheet.

In FIG. 17, a relatively flat vertical wall 257 faces the convex surface of a curved sheet C. The axis of curvature for the sheet C is parallel to the path of movement for the sheet. The bottom edge of the sheet is guided and supported on grooves 21 of successive rolls 20. The grooves 21 are aligned in the path of movement desired for the sheet. Fluid (gas) is directed upward between the vertical wall 257 and the convex surface of sheet C toward the throat 256. Thus, fluid flows in the direction in which the distance between the sheet and the wall decreases, then increases as shown by the arrow in the drawing.

In consequence of this flow, the sheet is held closely to wall 257 by the atmospheric pressure applied to the opposite side of the sheet. However, the flow of the gas in the space between the sheet and the wall holds the glass away from the wall.

In FIG. 18, a convexly curved vertical wall 258 faces one surface of a relatively flat sheet F. The axis of curvature for the convex wall 258 is parallel to the path of movement for the sheet F. The bottom edge of sheet F is guided, supported, and propelled in a manner similar to the previous embodiments. Fluid is directed upward between the vertical wall 258 and the sheet F toward the throat 256. Again, the direction of flow is one in which the distance between the sheet and the wall decreases, then increases. The arrow in FIG. 18 depicts the direction of fluid flow.

In FIG. 19, a convex wall 260 is composed of a lower portion 262 and an upper portion 264. Lower portion 262 is tilted toward the vertical plane of the path taken by the sheets. Upper portion 264 is tilted away from said vertical plane. Fluid is directed in the same manner as FIGS. 17 and 18, toward the throat 256, where the spacing between the wall 260 and the flat sheet F narrows, as shown by the arrow.

In FIG. 20, fluid flow toward a throat or restriction 256 is used to support a curved glass sheet C in closely spaced relation to a convex wall 258 of smaller radius of curvature than that of the curved sheet. The relatively shallow curvature of the concave surface of the curved sheet faces the convex wall 258.

FIG. 21 shows a concave vertical wall 266 of rather shallow curvature forming a restricted passage with the convex surface of a relatively sharply curved sheet C. In this embodiment, fluid flows in the direction of the arrow toward the throat 256 as in the other embodiments to support the sheet in closely spaced relation to the wall 266.

As shown in the drawings, the wall to which the glass clings perferably provides a converging space in the direction of the gas flow to a central level of the sheet and a diverging space above such converging space. It will be understood that the converging space may extend above the middle of the sheet if desired. Furthermore, the diverging space may be omitted although best support is obtained when such a diverging space between the glass and the wall is provided. Moreover, the direction of flow of gas in FIGS. 17 to 21 inclusive may be reversed without changing the support character of the system.

It should be evident from the foregoing disclosure that numerous modifications or alterations may be made without departing from the spirit and scope of the invention as set forth in the claimed subject matter which follows. Such modifications include supporting the bottom edge of the glass on carriers or a flexible belt or chain instead of spaced rolls. Other modifications include the combination of different type of supports for the flat glass during its heating prior to its being supported in the manner depicted above during bending and tempering.

For example, the glass sheet may be supported horizontally while conveyed on spaced horizontal rollers or on a fluid bed during its heating and pivoted or otherwise transferred into a vertical position prior to its shaping, or the glass sheet may be gripped by tongs until its temperature reaches the deformation point, at or before which time the glass sheet may be transferred to the bottom edge support disclosed hereinabove for the completion of its heating and for its shaping and tempering. It is also understood that the present invention is suitable for bending sheets other than glass and is also suitable for bending sheets of glass or other material about two axes angularly disposed relative to one another as well as about a horizontal axis of bending described above.

What is claimed is:

1. A method of supporting a sheet in a stable position which comprises disposing the sheet with an edge surface thereof on a support closely adjacent an upward extending wall so that there is gradually decreasing distance between the wall and the sheet to a throat and an expanded area beyond the throat, and directing fluid between the wall and only one major surface of the sheet facing said wall in the direction of said decreasing distance through the throat at a pressure sufficient to produce a Venturi effect to hold the sheet close to said wall without touching.

2. The process of claim 1 wherein the sheet, prior to said supporting, is heat-softened, pressed between a pair of shaping members having complementary convex and concave shaping surfaces and the shaping members separated from the sheet, is supported after said separation of said shaping members, as defined in claim 1.

3. A method of balancing a sheet comprising supporting said sheet on its lower edge surface, disposing said sheet adjacent a converging and diverging wall to provide a space having a narrow portion and wide portions between a major surface of said sheet and said wall, and flowing fluid between said wall and said major surface only from one of said wider portions through said narrow portion at a pressure sufficient to produce a Venturi effect to hold the sheet close to said wall without touching.

4. A method of supporting a curved sheet in stable position which comprises disposing the sheet with an edge surface thereof on a support closely adjacent an upwardly extending wall having a larger radius of curvature than that of the bent sheet so that there is gradually decreasing distance between the wall and the sheet, and directing fluid between the wall and one surface only of the sheet in the direction of said decreasing distance at a pressure sufficient to produce a Venturi effect to hold the sheet close to said wall without touching.

5. A method of supporting a glass sheet, bent about an axis extending substantially horizontally, in an upright disposition which comprises disposing the sheet on its edge on a support closely adjacent a flat wall so that the distance between said wall and said sheet decreases in an upward direction, and directing fluid in said upward direction only between the relatively flat wall and the convex surface of said sheet at a pressure sufficient to produce a Venturi effect to hold the sheet close to said wall without touching.

6. A method of supporting a flat sheet in stable position comprising engaging the bottom edge surface of said sheet with spaced support elements and directing fluid only between said flat sheet and a curved wall spaced closely and in convex relation to said sheet at a pressure sufficient to produce a Venturi effect to hold the sheet close to said wall without touching.

7. A method of supporting a curved sheet in an upright plane comprising engaging the bottom edge surface of said sheet with spaced support elements and directing fluid upward between a corner surface of said sheet and an upright wall closely adjacent to said convex surface of said curved sheet and having a first portion more closely spaced from said curved sheet than a portion below said first portion at a pressure sufficient to produce a Venturi effect to hold the sheet close to said wall without touching.

8. In the art of bending a heat-softened flat glass sheet, the improvement comprising supporting said flat glass sheet upon a lower edge surface thereof between a pair of glass shaping members having complementary convex and concave shaping surfaces, directing fluid upward only between said glass sheet and said convex shaping surface while moving said shaping members toward the opposite surfaces of said glass sheet at a pressure sufficient to produce a Venturi effect to hold the sheet close to said wall without touching, and engaging the opposite surfaces of said heat-softened glass sheet in pressurized engagement between said shaping members while so supported.

9. In the art of bending a heat-softened flat glass sheet, the improvement comprising supporting said flat glass sheet upon a lower edge surface thereof between a pair of glass shaping members having complementary convex and concave shaping surfaces extending upward, directing fluid upward only between said glass sheet and said convex shaping surface at a pressure sufficient to produce a Venturi effect to hold the sheet close to said wall without touching while moving said shaping members toward the opposite surfaces of said glass sheet, contacting one surface of the glass sheet with the concave shaping surface while the convex shaping surface is spaced from the glass sheet, then moving the convex shaping surface into engagement with the other surface of said heat-softened glass sheet until said heat-softened glass sheet is shaped to conform to said shaping surfaces.

10. A method of supporting a sheet from the class consisting of flat and curved sheets comprising disposing the sheet adjacent a wall that provides a space between the wall and the sheet which is first converging and then diverging and directing fluid in a direction along which said space converges and diverges through said space between said wall and said sheet at a pressure sufficient to produce a Venturi effect to hold the sheet close to said wall without touching while engaging an edge portion of said sheet.

11. A method as in claim 10, wherein said sheet is subjected to heat transfer by projecting fluid at a different temperature than that of said sheet against said sheet while said sheet it so supported.

12. A method of bending and tempering glass sheets as they are moved along a predetermined path in a forward direction through successive heating, bending and chilling areas comprising supporting one major surface only of said sheets on heated gas to maintain one edge thereof at a higher elevation than an edge opposite said one edge during movement through said heating area to heat said sheets to a deformation temperature by applying said heated gas under pressure between each of said sheets and a wall adjacent thereto that provides a space that first converges and then diverges in a direction along which said space converges and diverges through said space at a pressure sufficient to provide a Venturi effect to hold the sheet close to said wall without touching, interrupting the forward movement of said sheets in said bending area, and, while maintaining said sheets stationary and while said sheets are at a deformation temperature, pressing said sheets into a desired curvature between complemental shaping surfaces and, then moving said shaped sheets through said chilling area while supporting said shaped sheets on relatively cool gas to rapidly reduce the temperature of the sheets to temper the glass.

13. A method of bending and tempering glass sheets as recited in claim 12, wherein said glass sheets are supported on an edge surface in a substantially vertical plane as they are moved along said path.

References Cited

UNITED STATES PATENTS

| | | | |
|---|---|---|---|
| 2,395,727 | 2/1946 | Devol | 65—182 X |
| 2,476,169 | 7/1949 | White et al. | 65—273 X |
| 3,048,383 | 8/1962 | Champlin | 65—182 X |
| 3,062,520 | 11/1962 | Frey et al. | |

DONALL H. SYLVESTER, *Primary Examiner.*

A. D. KELLOGG, *Assistant Examiner.*

UNITED STATES PATENT OFFICE

CERTIFICATE OF CORRECTION

Patent No. 3,341,312            September 12, 1967

Robert William Wheeler et al.

It is hereby certified that error appears in the above numbered patent requiring correction and that the said Letters Patent should read as corrected below.

Column 14, line 33, for "corner" read -- convex --.

Signed and sealed this 29th day of October 1968.

(SEAL)
Attest:

Edward M. Fletcher, Jr.

Attesting Officer

EDWARD J. BRENNER

Commissioner of Patents